(12) United States Patent
Watanabe et al.

(10) Patent No.: US 7,187,321 B2
(45) Date of Patent: Mar. 6, 2007

(54) INTERFERENCE DETERMINATION METHOD AND FMCW RADAR USING THE SAME

(75) Inventors: Yuu Watanabe, Toyota (JP); Kazuma Natsume, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/403,995

(22) Filed: Apr. 13, 2006

(65) Prior Publication Data

US 2007/0018886 A1    Jan. 25, 2007

(30) Foreign Application Priority Data

Apr. 15, 2005    (JP) .............................. 2005-118498

(51) Int. Cl.
*G01S 7/40* (2006.01)
*G01S 7/35* (2006.01)
*G01S 13/34* (2006.01)
*G01S 13/93* (2006.01)

(52) U.S. Cl. ......................... 342/173; 342/89; 342/91; 342/118; 342/128; 342/159; 342/165; 342/174; 342/175; 342/195; 342/196

(58) Field of Classification Search .................. 342/27, 342/28, 59, 70–72, 89–115, 118, 128–133, 342/165–175, 192–197, 159
See application file for complete search history.

(56) References Cited

U.S. PATENT DOCUMENTS

| | | | | |
|---|---|---|---|---|
| 3,618,083 A | * | 11/1971 | Burley et al. ................. | 342/28 |
| 4,106,018 A | * | 8/1978 | Chihak et al. ................ | 342/59 |
| 4,827,263 A | * | 5/1989 | Jones et al. ................... | 342/59 |
| 5,274,380 A | * | 12/1993 | Yatsuka et al. ............... | 342/70 |
| 5,317,320 A | * | 5/1994 | Grover et al. .............. | 342/159 |
| 5,345,470 A | * | 9/1994 | Alexander ................... | 342/101 |
| 6,094,160 A | * | 7/2000 | Lajiness ...................... | 342/70 |
| 6,380,887 B1 | * | 4/2002 | Suen .......................... | 342/159 |
| 6,429,807 B2 | * | 8/2002 | Shiratori et al. ............ | 342/173 |
| 2001/0035839 A1 | * | 11/2001 | Shiratori et al. ............ | 342/128 |

FOREIGN PATENT DOCUMENTS

JP    2002-168947    6/2002

* cited by examiner

*Primary Examiner*—Bernarr E. Gregory
(74) *Attorney, Agent, or Firm*—Harness, Dickey & Pierce, PLC

(57) ABSTRACT

Occurrence of interference is detected using sampled amplitude data obtained by oversampling a beat signal. It is detected by comparing the absolute value (|VD|) of variation in the sampled data with a threshold value (TH). When interference occurs, a wideband signal is superposed on the beat signal, and this disturbs the signal waveform of the beat signal to drastically varies its amplitude. Therefore, occurrence of interference can be detected without fail regardless of the scheme on which a radar as the source of an interference wave is based and even when the amplitude of the interference wave is low. In addition, when low-frequency noise is superposed on the beat signal, erroneous detection of occurrence of interference can be prevented.

7 Claims, 10 Drawing Sheets

INTERFERENCE DETERMINATION METHOD AND FMCW RADAR USING THE SAME

CROSS REFERENCE TO RELATED APPLICATION

This application is based on and incorporates herein by reference Japanese Patent Application No. 2005-118498 filed on Apr. 15, 2005.

FIELD OF THE INVENTION

The present invention relates to an interference determination method for FMCW radars for determining occurrences of interference between an FMCW radar and some other radar, and an FMCW radar which determines occurrences of interference with some other radars.

BACKGROUND OF THE INVENTION

FMCW radars have been conventionally used as one of vehicle-mounted radars to detect any obstacle, a distance to a vehicle ahead, and a relative speed from the vehicle ahead.

The FMCW radar transmits a radar wave frequency-modulated so that its frequency linearly varies with time. It receives a reflected wave that is the radar wave reflected by a target, and mixes the transmission signal and the received signal to generate a beat signal. This beat signal is subjected to frequency analyses (FFT or the like) to detect the frequency of a peak component (beat frequency). The relative speed between the subject vehicle and the target that reflected the radar wave and the distance to the target are determined based on the beat frequency.

In case of FIG. 11, a vehicle-mounted radar Rs of a subject vehicle S receives not only the reflected wave resulting from the radar wave transmitted from itself (the radar R). It can also receive a radar wave transmitted from another vehicle-mounted radar Ri in any other interfering vehicle, such as an oncoming vehicle or a vehicle running aside (not shown). As a result, interference between vehicle-mounted radars Rs and Ri can occur. When such interference occurs, the following problem results: a beat frequency cannot be detected with accuracy, and a relative speed or distance is erroneously determined.

For solving this problem, JP-A-2002-168947 proposes an FMCW radar provided with an interference detection unit. This interference detection unit determines that interference due to some other radar has occurred in the following cases: cases where the amplitude of a received signal or a beat signal is higher than a preset threshold value for amplitude; and cases where a detected beat frequency (the frequency of the peak component of a beat signal) is higher than a preset threshold value for frequency.

Methods in which an amplitude is compared with a threshold value for amplitude are based on the following idea: when interference with some other radar occurs, a radar wave from the other radar is received in addition to the reflected wave associated with the relevant radar; therefore, the amplitude of a received signal or a beat signal is increased as compared with cases where there is no interference. Methods in which a frequency is compared with a threshold value for frequency are based on the following idea: when a frequency corresponding to the maximum value within a range of detection is set as a threshold value for frequency, it can be determined whether any abnormal input beyond the range of detection is present or not.

However, the methods in which occurrence of interference is determined from the amplitude of a received signal or a beat signal involve a problem of possible erroneous detection. In cases where the amplitude of an interference wave is low, a problem illustrated in FIG. 12A arises. That is, the amplitude of a received signal or a beat signal does not exceed a threshold value Vh for amplitude. Though interference with some other radar actually occurs, therefore, that interference is not detected. In cases where low-frequency noise (undulation) that is produced when a transmitting antenna and a receiving antenna are not sufficiently isolated or on like occasions is superposed, a problem illustrated in FIG. 12B arises. That is, the amplitude exceeds the threshold value Vh for amplitude. Though interference with some other radar does not actually occur, interference is detected.

Low-frequency noise could be removed through a filter. In this case, however, the following problem arises: a beat signal of a low frequency arising from a reflected wave from a target present at a short distance is also attenuated. As a result, the detecting capability for short range can be degraded.

The methods in which occurrence of interference is determined from a beat frequency (the frequency of the peak component of a beat signal) Fb involve the following problem: these methods are on the precondition that the subject vehicle and some other vehicle (the source of an interference wave RF) must be identical with each other in the modulation gradient of a radar wave transmitted by a vehicle-mounted radar (FMCW radar), as illustrated in FIG. 13A. In terms of practical use, occurrence of interference cannot be detected in almost all cases.

The reason is as follows: when there is a difference in modulation gradient, even if only slightly, between a received wave based on a transmitted wave from the subject vehicle and a received wave based on a transmitted wave from some other vehicle, a problem arises. The difference in gradient becomes the frequency of a beat signal, as illustrated in FIG. 13B. Therefore, the beat signal contains a wideband frequency component. As a result, when the noise floor of the beat signal rises, only a specific frequency component is not outstandingly enlarged for that reason alone. That is, it is not detected as frequency peak.

Also, the methods in which occurrence of interference is determined from a beat frequency involve the following problem, even when all the FMCW radars are identical in the modulation gradient of radar wave: in cases where some other vehicle's vehicle-mounted radar is not of FMCW, the phenomenon illustrated in FIG. 13C occurs. (Examples of methods other than FMCW include two-frequency CW, multifrequency CW, pulse, spread spectrum, and the like.) That is, a frequency component present in a beat signal under the influence of interference wave becomes undoubtedly wideband, and occurrence of interference cannot be detected.

SUMMARY OF THE INVENTION

It is an object of the present invention to provide an interference detection method for FMCW radars and an FMCW radar, in which, in cases where interference occurs, that can be detected without fail regardless of the scheme on which a radar as the source of interference is based.

According to one aspect of the present invention, a transmission signal of a radar wave frequency-modulated so that its frequency linearly varies with time is mixed with a received signal of a reflected wave that is the radar wave reflected by a target to generate a beat signal. This beat signal is sampled. When a variation in the sampled data obtained by this sampling exceeds a preset upper limit value, it is determined that interference with some other radar has occurred.

Thus, the occurrence of interference is determined not directly by the amplitude of the beat signal (sampled data) but by its variation. Therefore, occurrence of interference can be detected without fail even in cases where low-frequency noise is superposed on the beat signal or in cases where the amplitude of an interference wave is low.

The signal waveform of the beat signal on which a wideband frequency component is superposed under the influence of interference is disturbed and its amplitude varies at high rates especially because of the following: the presence of a frequency component higher than the maximum frequency of the beat signal determined by the maximum relative speed or the maximum distance that can be detected with an FMCW radar. Therefore, occurrence of interference can be determined from variation in this amplitude (i.e., sampled data).

The beat frequency of the signal component of the beat signal based on the reflected wave that is a radar wave reflected by a target is high. As illustrated in FIG. 8A, the received power of this reflected wave is reduced with increase in the distance from the target, that is, increase in beat frequency.

FIG. 8B illustrates the waveform of the beat signal based on the reflected wave from a short-distance target SDT; FIG. 8D is its enlarged chart; FIG. 8C illustrates the waveform of the beat signal based on a reflected wave from a long-distance target LDT; and FIG. 8E is its enlarged chart.

As illustrated in FIGS. 8B to 8E, with respect to the signal component of a beat signal based on the reflected wave from the short-distance target SDT, the amplitude (sampled data) is large but the beat frequency is low (the variable period of amplitude is long). As illustrated in FIG. 8F, variation |VD| in amplitude (sampled data) can be suppressed to a certain threshold value or lower value. With respect to the signal component of the beat signal based on the reflected wave from the long-distance target LDT, the beat frequency is high (the variable period of amplitude is short) but the amplitude (sampled data) is small. Also in this case, as illustrated in FIG. 8G, variation |VD| in amplitude (sampled data) can be suppressed to a certain threshold value or lower value. That is, the reflected wave from the target to be detected is not erroneously detected as that due to the influence of interference.

According to another aspect of the present invention, a FMCW radar is constructed as follows: a transmitting and receiving circuit transmits a radar wave frequency-modulated so that its frequency linearly varies with time. At the same time, it receives a reflected wave that is the radar wave reflected by a target. The transmitting and receiving means mixes the transmission signal of the radar wave and the received signal of the reflected wave to generate a beat signal. Based on this beat signal, the relative speed between the subject vehicle and the target or the distance to the target is determined.

The beat signal generated by the transmitting and receiving circuit contains a signal component equal to or higher than the maximum frequency of the beat signal determined based on the maximum relative speed or the maximum distance that can be detected with the MCW radar. This beat signal generated by the transmitting and receiving means is sampled by a sampling circuit.

Then, a variation computing means computes a variation in sampled data obtained as the result of sampling by the sampling circuit. When the computed variation exceeds a preset upper limit value, a determining circuit determines that interference with some other radar has occurred.

When a target having a large effective reflection sectional area exists, the received power of the reflected wave from the target is larger than those having ordinary effective reflection sectional areas, as illustrated in FIG. 9A. That is, large received power is obtained though the target is a long-distance target high in beat frequency. As illustrated in FIGS. 9B (normal sampling) and 9D (oversampling), therefore, variation |VD| in amplitude (sampled data) is increased and exceeds a threshold value TH. As a result, there is a possibility that it may be erroneously detected that interference has occurred.

To cope with this, it is preferable that the sampling circuit should sample the beat signal at a sampling frequency higher than twice the maximum frequency of the beat signal. That is, it is preferable that the sampling circuit should carry out oversampling.

In this case, as illustrated in FIGS. 9C and 9E, data is collected at shorter time intervals. Therefore, variation |VD| in the amplitude of a beat signal within sampling intervals, that is, variation in sampled data can be suppressed.

More specifically, in cases where the maximum frequency of the beat signal set based on detecting capability agrees with ½ of sampling frequency, the following takes place: the relation between the signal waveform of the beat signal containing only frequency components smaller than the maximum frequency, that is, the signal waveform of the beat signal free from interference and sampling timing is as illustrated in FIG. 10A. This is the case even when a case where the amplitude varies to the utmost extent is grasped. The relation between the signal waveform of a beat signal containing a frequency component larger than the maximum frequency, that is, the beat signal involving interference and sampling timing is as illustrated in FIG. 10B.

Therefore, when there is no interference, the maximum value of variation in amplitude (sampled data) is reduced without fail by oversampling. When there is interference, however, it is not always reduced. As a result, occurrence of interference can be grasped with higher accuracy by determination based on variation in amplitude (sampled data).

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
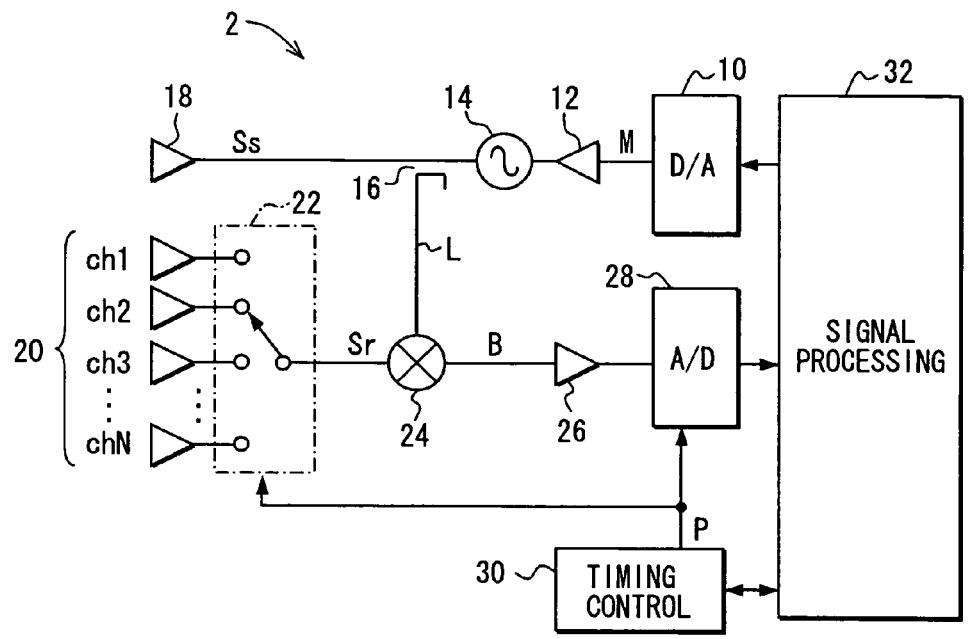
FIG. 1 is a block diagram illustrating a vehicle-mounted radar.

Referring to FIG. 1, a vehicle-mounted radar 2 includes: a D-A converter 10 that generates a triangular-wave modulating signal M according to a modulation command; a voltage-controlled oscillator (VCO) 14 to which the modulating signal M generated by the D-A converter 10 is applied through a buffer 12 and varies its oscillating frequency according to the modulating signal M; a divider 16 that divides the power of the output of the VCO 14 to a transmission signal Ss and a local signal L; a transmitting antenna 18 that radiates a radar wave corresponding to the transmission signal Ss.

The radar 2 further includes: a receiving antenna unit 20 constructed of N receiving antennas that receive radar waves; a reception switch 22 that uniquely and sequentially selects any of the antennas of the receiving antenna unit 20 according to a timing signal P, and supplies a received signal Sr from the selected antenna to the subsequent stage; a mixer 24 that mixes the received signal Sr supplied from the reception switch 22 and the local signal L to generate a beat signal B; an amplifier 26 that amplifies the beat signal B generated by the mixer 24; an A-D converter 28 that samples the beat signal B, amplified at the amplifier 26, according to the timing signal P and converts it into digital data; a timing control unit 30 that generates the timing signal P; and a signal processing unit 32 that outputs the modulation command to the D-A converter 10, performs signal processing on the sampled data of the beat signal B taken in through the A-D converter 28, and thereby determines the distance to a target that reflects a radar wave, the relative speed between the subject vehicle and the target, and the direction in which the target exists.

Figure 2:
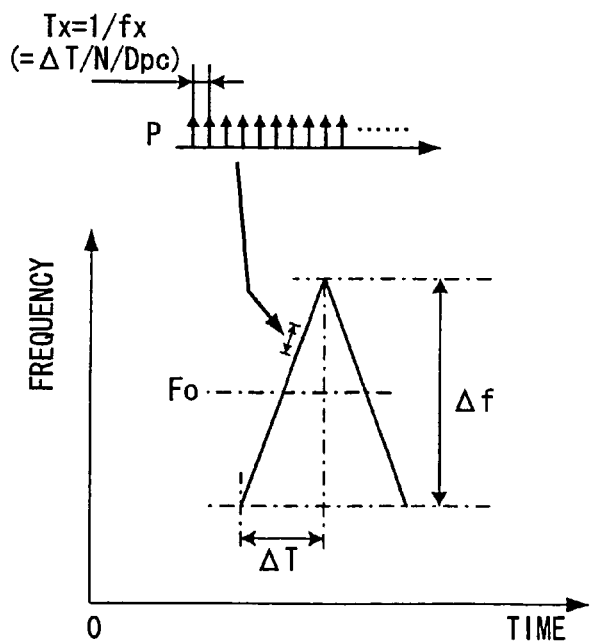
FIG. 2 is a graph illustrating setting of a radar wave transmitted by a vehicle-mounted radar.

The VCO 14 generates a high-frequency signal in a millimeter wave band, so modulated that its frequency is linearly and gradually increased or decreased with time, according to the triangular-wave modulating signal M. The high-frequency signal is so constructed that its frequency is varied as illustrated in FIG. 2. That is, letting the center frequency be Fo, the frequency is linearly increased by a frequency fluctuation range $\Delta f$ during a sweeping time $\Delta T$, and then the frequency is linearly decreased by the frequency fluctuation range $\Delta f$ during the same sweeping time $\Delta T$. However, the center frequency Fo can be arbitrarily varied according to a command from the signal processing unit 32.

Each antenna of the receiving antenna unit 20 is so set that its beam width includes the entire beam width of the transmitting antenna 18. The beam width of each antenna is equivalent to the range of angle in which reduction in gain relative to the frontward direction is 3 dB or less. The antennas are assigned to ch1 to chN, respectively.

The timing control unit 30 generates a pulse train whose period is Tx as the timing signal P. Letting the number of times of sampling per channel be Dpc and the sampling frequency per channel be fs, the period Tx of the timing signal P is established by Expression (1) and the sampling frequency fx is established by Expression (2).

$$Tx = 1/fx = \Delta T/N/Dpc \quad (1)$$

$$Fx = N \times fs \quad (2)$$

The sampling frequency fs per channel is so set that it is equal to a value larger than the maximum frequency of a beat signal to be detected. The value is preferably twice the maximum frequency or larger. That is, it is so set that oversampling is carried out.

The reception switch 22 is so constructed that the following operation is performed: it sequentially changes the selected channel each time a pulse is inputted, according to the timing signal P; and it sequentially selects all the N channels (ch1 to chN) and repeatedly selects them.

The signal processing unit 32 is constructed based on a known microcomputer constructed of CPU, ROM and RAM. In addition, the signal processing unit 32 is provided with a digital signal processor (DSP) for performing fast Fourier transformation (FFT) on data taken in through the A-D converter 28. It performs the following processing: processing to generate the modulation command to cause the frequency to be linearly increased (upward modulated) by the frequency fluctuation range $\Delta f$ during the sweeping time $\Delta T$ and thereafter linearly decreased (downward modulated) by the frequency fluctuation range $\Delta f$ during the sweeping time $\Delta T$; distance/relative speed/direction detection processing to determine the distance to a target, the relative speed between the subject vehicle and the target, and the direction in which the target exists based on the sampled data of the beat signal B obtained through the A-D converter 28 during the sweeping time $\Delta T$; and interference determination processing to determine the presence/absence of interference with some other radar.

In the above vehicle-mounted radar 2, the divider 16 subjects the high-frequency signal, generated by the VCO 14 according to the modulating signal, to power division. As a result, the transmission signal Ss and the local signal L are generated, and this transmission signal Ss is transmitted as a radar wave through the transmitting antenna 18.

The radar wave that is transmitted from the transmitting antenna 18, is reflected by a target such as a preceding or oncoming vehicle and comes back as a reflected wave is received by all the receiving antennas of the receiving antenna unit 20. Only the received signal Sr on the receiving channel chi(i=1 to N) selected by the reception switch 22 is supplied to the mixer 24. The mixer 24 mixes the local signal L from the divider 16 into this received signal Sr to generate the beat signal B. Amplified at the amplifier 26, the beat signal B is sampled at the A-D converter according to the timing signal P and taken into the signal processing unit 32.

As a result, measurement equivalent to one period including upward modulation and downward modulation (sweeping time $2 \times \Delta T$) is completed. Thus, Npc pieces of sampled data are taken into the signal processing unit 32 with respect to each of the channels ch1 to chNc and with respect to each of upward modulation and downward modulation.

Figure 3:
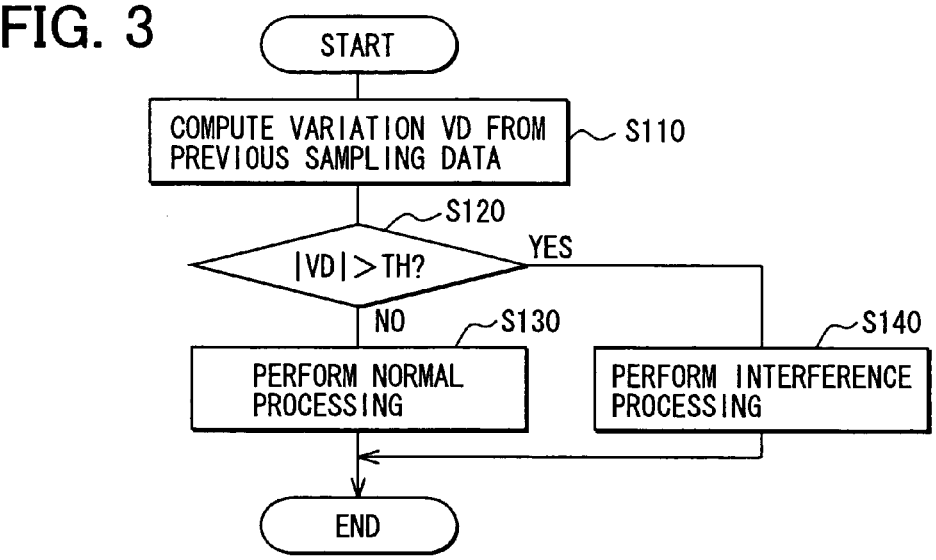
FIG. 3 is a flowchart illustrating interference determination processing.

Interference determination processing is carried out by the signal processing unit 32 based on sampled data taken in as shown in FIG. 3. This processing is performed with respect to each channel chi (i=1 to N). When sampled data on the relevant channel chi is acquired, the processing is started.

First at S110, a variation VD is computed from the previous sampled data on the channel chi, when the sampled data on the relevant channel chi is acquired. The previous sampled data is sampled data acquired a sampling period 1/fs before.

It is determined whether the absolute value |VD| of this variation is larger than a preset threshold value TH at S120. When the absolute value |VD| of the variation is equal to or smaller than the threshold value TH, the normal processing described later is performed at S130, and the processing is terminated. When the absolute value |VD| of the variation is larger than the threshold value TH, the interference processing described later is performed at S140, and the processing is terminated.

Here, the threshold value TH must be set to a value larger than the absolute value |VD| of variation in sampled data obtained when the signal component of the maximum beat frequency to be detected with the relevant radar 2 is sampled. The signal component is a signal component obtained when the reflected wave from the target existing at the maximum detection distance is received. At this time, however, the effective reflection sectional area of the target must be at the maximum.

In the normal processing (S130), the following operation is performed: when k-times oversampling, for example, is performed, data is thinned out to reduce the number of pieces of data to 1/k. That is, sampled data is stored only once every k times. In the interference processing (S140), sampled data is thinned out to reduce the number of pieces of data to 1/k as in the normal processing. When time to store sampled data comes, the value of the sampled data is zeroed before it is stored. That is, sampled data detected when interference occurs is interpolated with zero. However, the value with which interpolation is carried out is not limited to zero, and interpolation may be carried out by estimation from the preceding data and the subsequent data.

The sampled data stored as above is subjected to FFT processing, and the following are determined by distance/ relative speed/direction detection processing separately performed based on the result of this processing: the distance to the target (e.g., vehicle ahead), the relative speed between the subject vehicle and the target, the direction in which the target exist, and the like. When the sampled data zeroed by interference processing is higher than a preset upper limit value, the following operation, for example, may be performed: FFT processing is not performed and the sampled data is discarded; a period during which interference occurs is identified based on the sampled data zeroed by interference processing, and the sampled data obtained during the identified period is all zeroed.

When occurrence of interference is detected, the following operation, for example, may be performed: the center frequency Fo of the VCO 5 is varied, and the radar wave is transmitted using a frequency band different from that of the interference wave; in cases where the direction from which an interference wave comes can be detected, the reception of radar waves from that direction is prohibited.

Figure 4A:
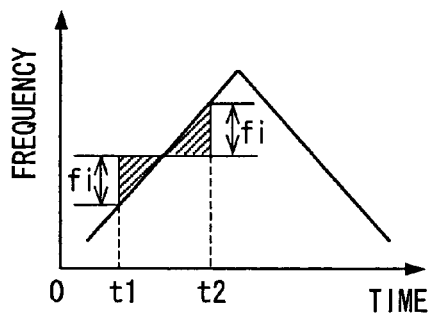
FIGS. 4A to 4C are graphs and a signal chart illustrating a beat signal generated by an interference wave from a CW radar.
Figure 4B:
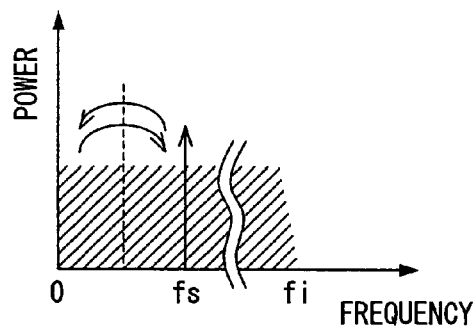
Figure 4C:
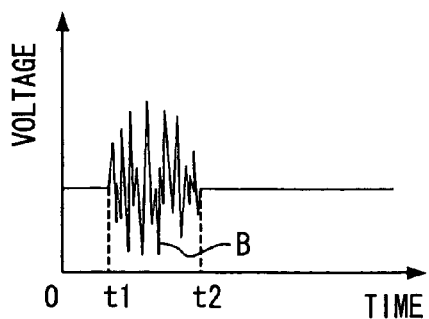

In the thus constructed vehicle-mounted radar 2, the following takes place when the interference wave from some other vehicle-mounted radar, CW radar, is received. FIGS. 4A to 4C illustrate a case where an interference wave from a CW radar is received. As illustrated in FIG. 4A, the difference between a frequency-modulated local signal L and an interference signal of a certain frequency becomes a signal component of a beat signal B. Therefore, the beat signal B uniformly contains frequency components of 0 to fi.

The frequency fi is the pass band that is the upper limit of the operating frequency of the mixer 24 and the amplifier 26. It is set to a value sufficiently larger (e.g., twice or so) than the sampling frequency fx so that the received signal Sr time-division multiplexed at the reception switch 22 or the time-division multiplexed beat signal B will not be deteriorated as shown in FIG. 4B.

Therefore, the beat signal B containing such a wideband frequency component is disturbed and its amplitude (voltage) is rapidly varied, as illustrated in FIG. 4C.

Figure 5A:
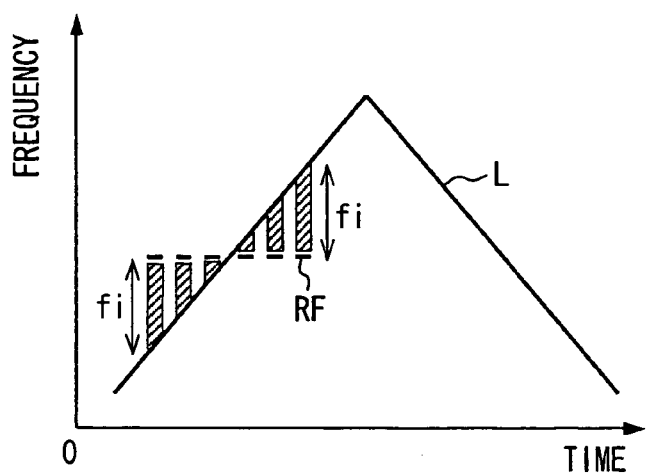
FIGS. 5A and 5B are graphs illustrating beat signals generated by interference waves from a pulse radar and an FMCW radar.
Figure 5B:
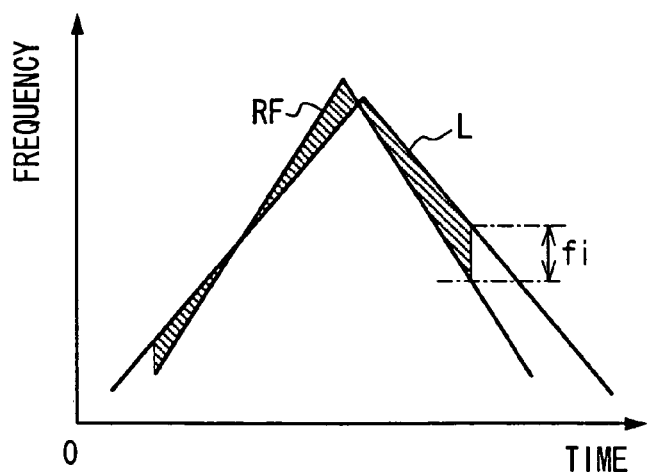

Also, in the following cases, a beat signal containing the wideband frequency component is generated, as in case of the CW radar. Therefore, when interference occurs, the beat signal B is disturbed and its amplitude is rapidly varied. Such cases include: cases where an interference wave is received from a pulse radar that transmits pulsed radar waves of a certain frequency, illustrated in FIG. 5A; and cases where an interference wave is received from an FMCW radar, different in the modulation gradient of radar wave from the vehicle-mounted radar 2, illustrated in FIG. 5B.

Figure 6A:
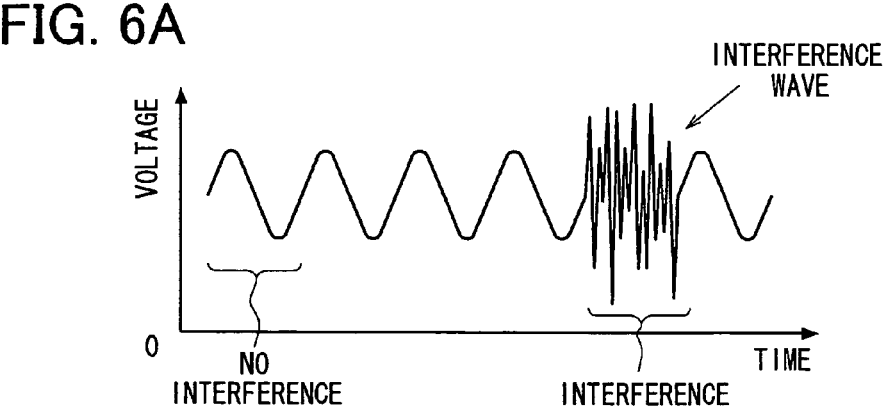
FIGS. 6A to 6E are graphs illustrating relations between variation in sampled data and its absolute values and threshold values at a portion not suffering interference and a portion suffering interference.
Figure 6B:
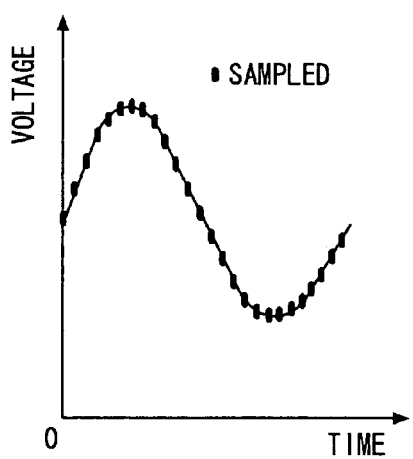
Figure 6C:
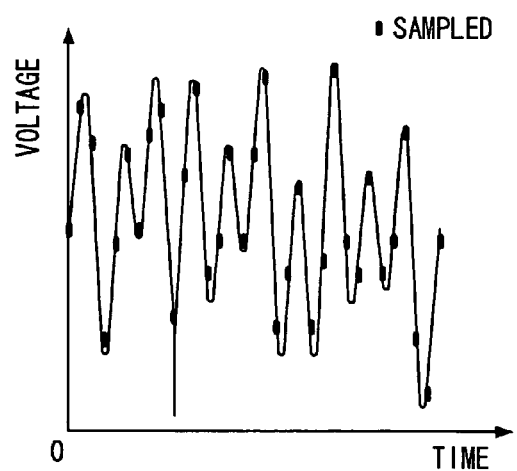
Figure 6D:
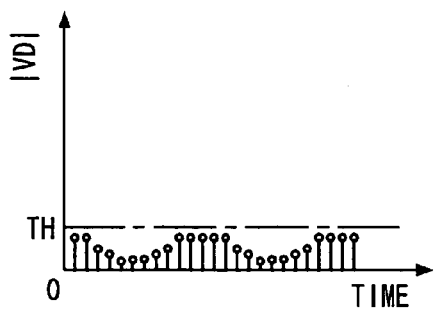
Figure 6E:
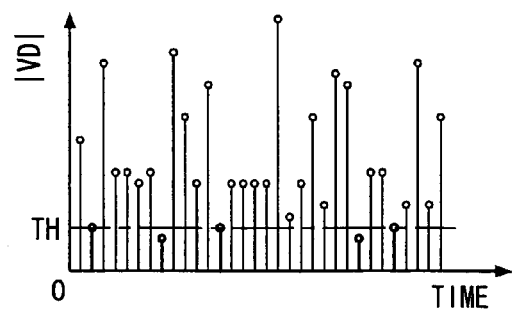

FIG. 6A is a waveform chart of a beat signal partly influenced by an interference wave; FIG. 6B is an enlarged chart of a portion that is not influenced by the interference in the waveform chart of FIG. 6A; and FIG. 6C is an enlarged chart of the portion that is influenced by the interference in FIG. 6A. FIG. 6D is a graph showing the absolute value |VD| of variation in sampled data, the amplitude of the beat signal B, determined by interference determination processing in correspondence with FIG. 6B. FIG. 6E is a graph similarly showing the absolute value |VD| of variation in sampled data in correspondence with FIG. 6C.

As illustrated in FIGS. 6B and 6D, in the portion that is not influenced by interference, the amplitude of the beat signal B does not largely vary in a short time, sampling period 1/fs. Therefore, the absolute value |VD| of variation in sampled data does not exceed the threshold value TH. As illustrated in FIGS. 6C and 6E, in the portion that is influenced by interference, the amplitude of the beat signal B largely varies in a short time, sampling frequency 1/fs, because of the presence of wideband signal components, especially, high-frequency component. Therefore, the absolute value |VD| of variation in sampled data exceeds the threshold value TH, and the occurrence of interference is detected.

As described above, the vehicle-mounted radar 2 determines occurrence of interference, not directly by the sampled data, amplitude, of beat signal B, but by the absolute value |VD| of the variation. Therefore, occurrence of interference can be detected without fail regardless of the scheme on which a radar as the source of an interference wave is based and even when the amplitude of the interference wave is low. In addition, in cases where low-frequency noise is superposed on the beat signal B, erroneous detection of occurrence of interference can be prevented without fail.

The vehicle-mounted radar 2 uses sampled data obtained by oversampling the beat signal B to determine the absolute value |VD| of variation. Therefore, even when a long-distance target having a large effective reflection sectional area exists, the absolute value |VD| of variation in its sampled data does not become too large. Therefore, the possibility that the reflected wave from the target to be detected may be erroneously detected as the interference wave can be suppressed.

In this embodiment, the D-A converter 10, buffer 12, VCO 14, power divider 16, transmitting antenna 18, receiving antenna unit 20, reception switch 22, mixer 24, and amplifier 26 operate as a transmitting and receiving circuit. The A-D converter 28 and the timing control unit 30 operate as a sampling circuit. The signal processing unit 32 computes the variation VD at S110 and determines occurrence of interference at S120.

The present invention is not limited to the above embodiment. The present invention can be embodied in various other modes without departing from the subject matter of the invention.

Figure 7A:
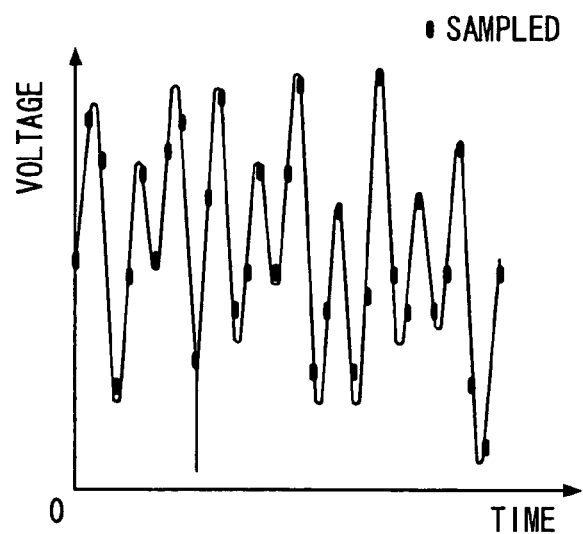
FIGS. 7A and 7B are graphs illustrating relations between variation in sampled data and a tolerance defined by threshold values.
Figure 7B:
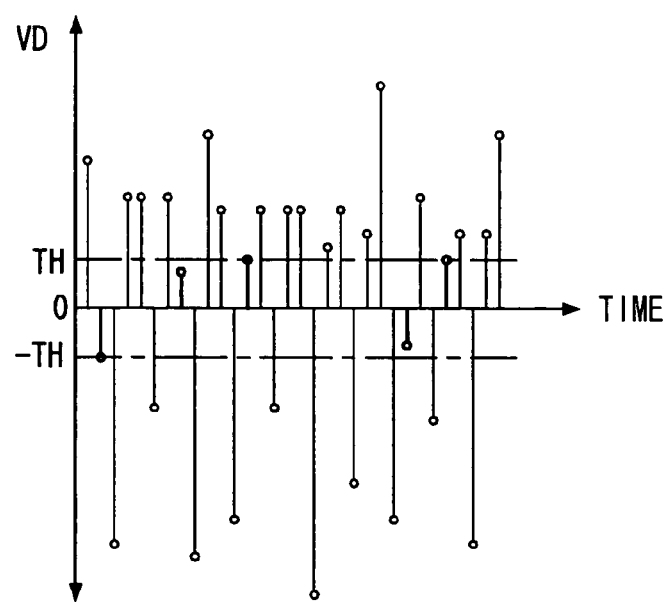
Figure 8A:
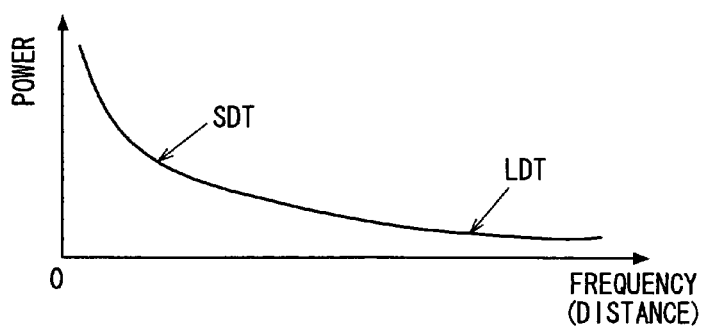
FIGS. 8A to 8G are graphs illustrating that erroneous detection is not made even at high beat frequency.
Figure 8B:
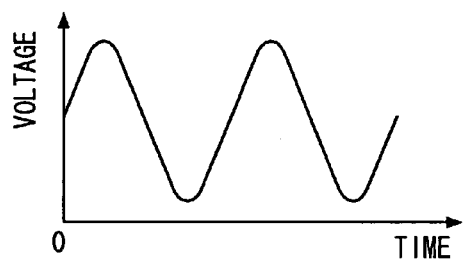
Figure 8C:
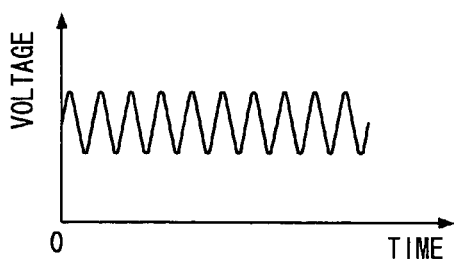
Figure 8D:
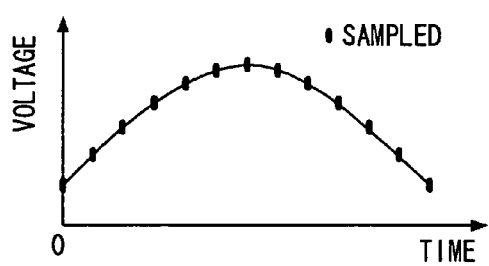
Figure 8E:
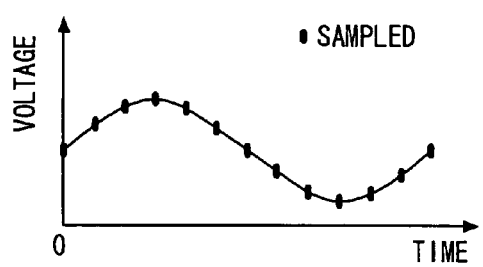
Figure 8F:
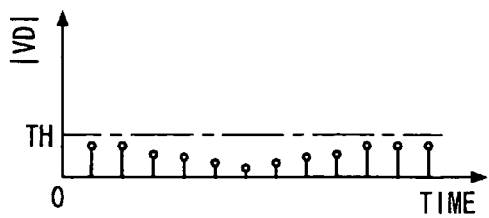
Figure 8G:
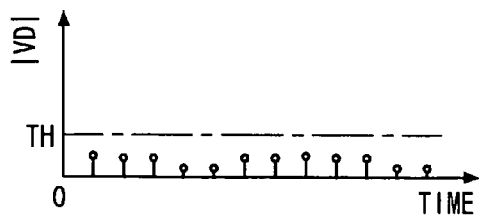
Figure 9A:
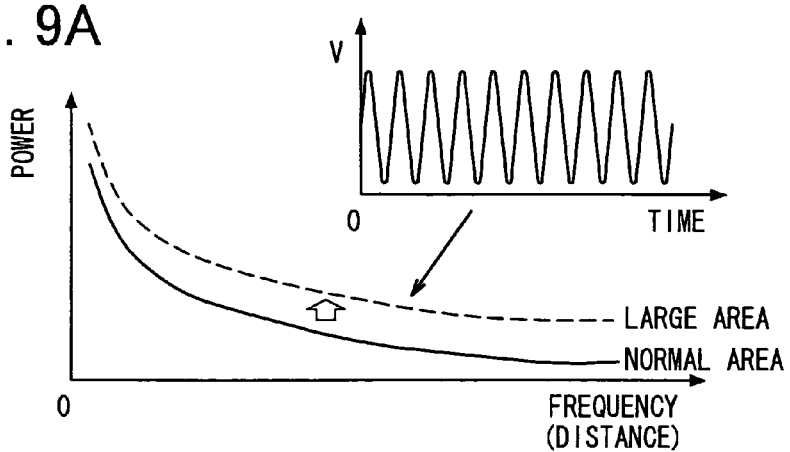
FIGS. 9A to 9E are graphs illustrating the effect of oversampling.
Figure 9B:
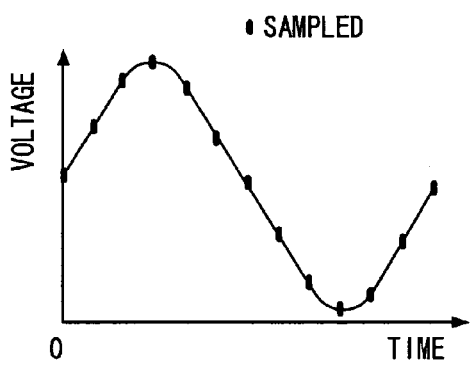
Figure 9C:
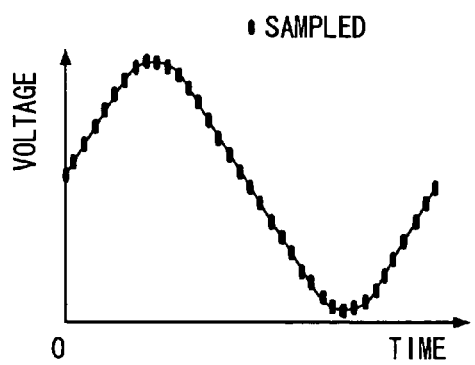
Figure 9D:
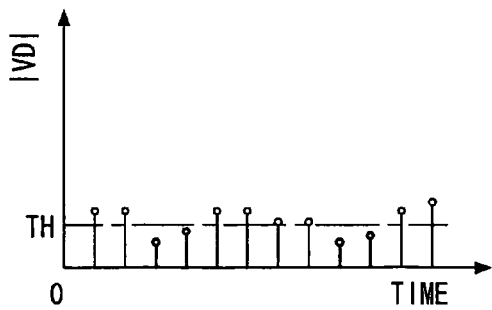
Figure 9E:
Figure 10A:
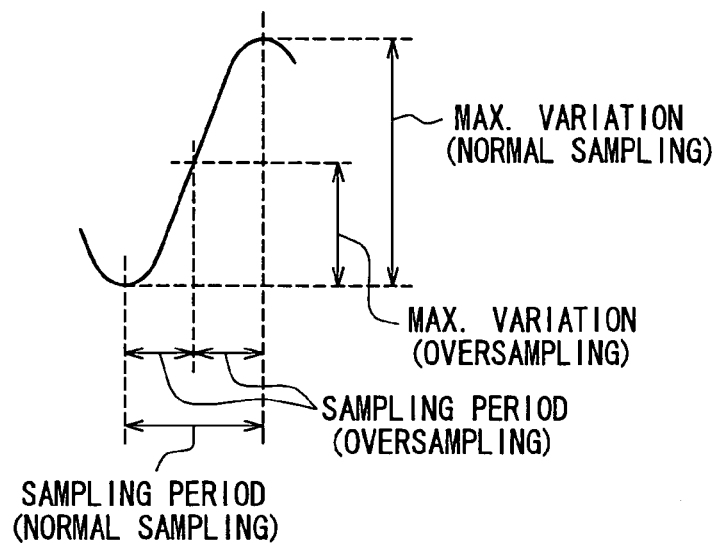
FIGS. 10A and 10B are graphs illustrating the principle underlying the phenomenon that, without interference, the maximum variation in sampled data is reduced by carrying out oversampling.
Figure 10B:
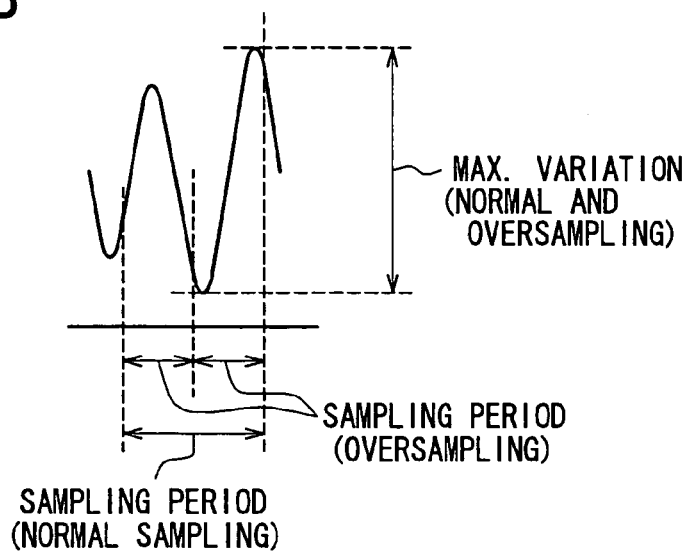
Figure 11:
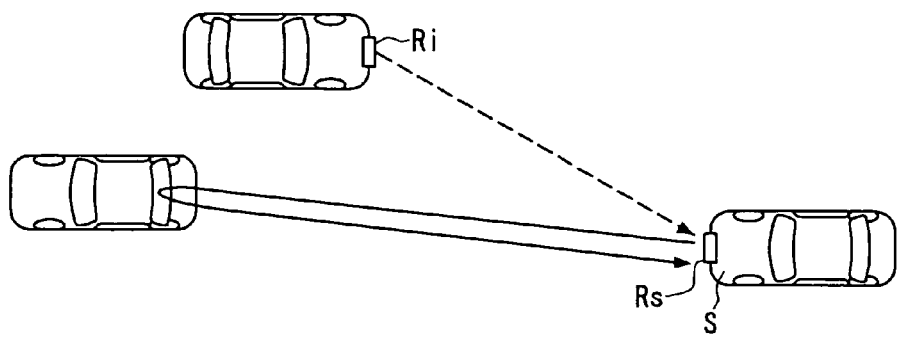
FIG. 11 is a schematic view illustrating an example of a case where interference occurs between vehicle-mounted radars.
Figure 12A:
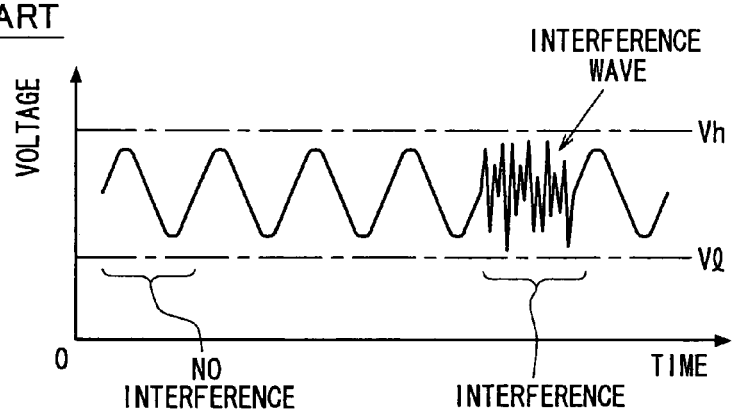
FIGS. 12A and 12B are signal charts illustrating problems associated with conventional FMCW radar.
Figure 12B:
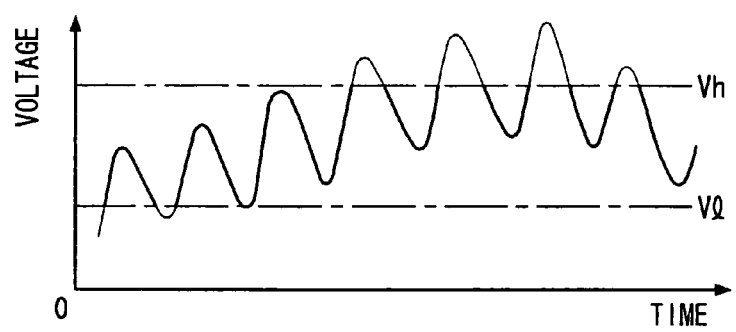
Figure 13A:
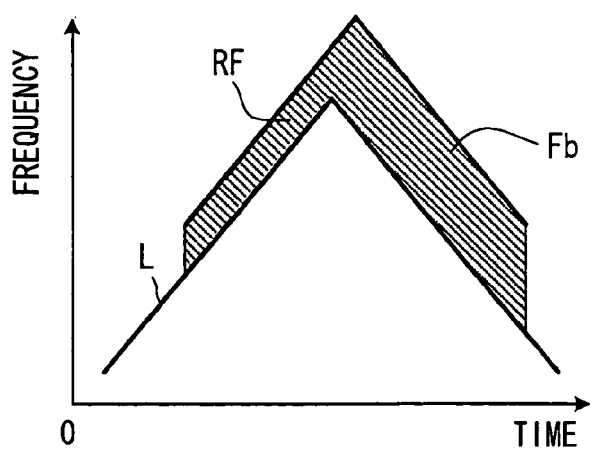
FIGS. 13A to 13C are graphs illustrating problems associated with conventional FMCW radar.
Figure 13B:
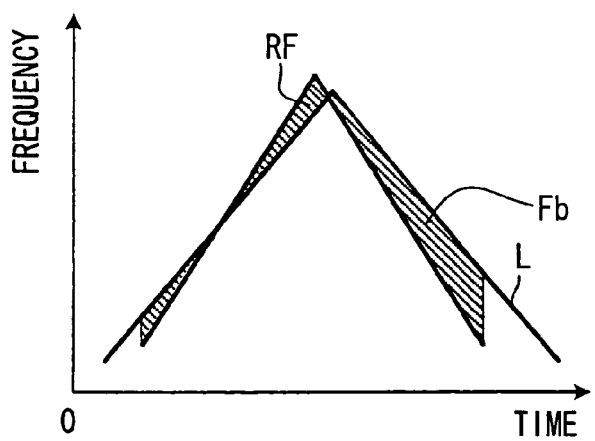
Figure 13C:
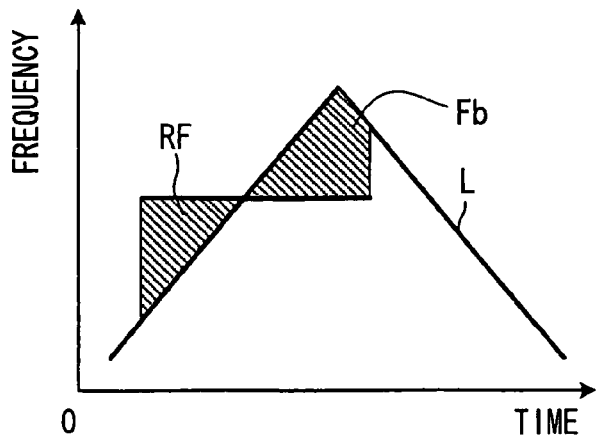

For instance, the presence/absence of interference may be determined based on whether the variation VD in the sampled data is within an allowable range (−TH to TH), as illustrated in FIGS. 7A and 7B. The antenna unit 20 may be a single antenna.

What is claimed is:

1. An interference determination method for FMCW radars, the method comprising the steps of:
generating a beat signal by mixing a transmission signal of a radar wave and a received signal of a reflected wave, wherein the transmission signal is frequency-modulated to vary linearly with time and the received signal is the radar wave reflected by a target;
sampling the beat signal to produce sampled data;
calculating a variation in the sampled data; and
determining occurrence of interference with some other radar when the variation exceeds a preset upper limit value.

2. The interference determination method according to claim 1,
wherein the beat signal contains a signal component higher than a maximum frequency determined based on a maximum relative speed or maximum distance that can be detected with the radar wave.

3. The interference determination method according to claim 2,
wherein the beat signal is sampled at a sampling frequency higher than the maximum frequency of the beat signal.

4. The interference determination method according to claim 3,
wherein the sampling frequency is higher than twice the maximum frequency of the beat signal.

5. An FMCW radar comprising:
a transmitting and receiving means that transmits a radar wave frequency-modulated to vary linearly with time, receives a reflected wave that is the radar wave reflected by a target, and mixes a transmission signal of the radar wave and a received signal of the reflected wave to generate a beat signal;
a sampling means that samples the beat signal;
a variation computing means that computes variation in sampled data obtained by the sampling means; and
a determining means that determines interference with some other radar, when the variation computed by the variation computing means exceeds a preset upper limit value,
wherein the beat signal generated by the transmitting and receiving means contains a signal component higher than a maximum frequency of the beat signal determined based on a maximum relative speed or maximum distance that can be detected with the radar wave of the transmitting and receiving means.

6. The FMCW radar according to claim 5,
wherein the sampling means samples the beat signal at a sampling frequency higher than the maximum frequency of the beat signal.

7. The FMCW radar according to claim 6,
wherein the sampling frequency is higher than twice the maximum frequency of the beat signal.

* * * * *